US005793039A

United States Patent [19]

Oishi et al.

[11] Patent Number: 5,793,039

[45] Date of Patent: *Aug. 11, 1998

[54] MASS SPECTROMETER, SKIMMER CONE ASSEMBLY, SKIMMER CONE AND ITS MANUFACTURING METHOD

[75] Inventors: Konosuke Oishi, Mito; Masamichi Tsukada, Higashiibaraki-gun; Toyoharu Okumoto; Takashi Iino, both of Hitachinaka, all of Japan

[73] Assignee: Hitachi Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 605,572

[22] Filed: Feb. 22, 1996

[30] Foreign Application Priority Data

Feb. 27, 1995 [JP] Japan .................................... 7-037883

[51] Int. Cl.[6] ............................ G01D 59/44; H01J 49/00

[52] U.S. Cl. ............................................................ 250/288

[58] Field of Search .................................... 250/281, 288, 250/282

[56] References Cited

U.S. PATENT DOCUMENTS

| | | | |
|---|---|---|---|
| 4,682,026 | 7/1987 | Douglas | 250/288 |
| 4,760,253 | 7/1988 | Hutton | 250/288 |
| 4,889,987 | 12/1989 | Gruen et al. | 250/282 |
| 4,963,735 | 10/1990 | Okamoto et al. | 250/288 |
| 5,051,584 | 9/1991 | Gray et al. | 250/288 |

*Primary Examiner*—Bruce Anderson
*Attorney, Agent, or Firm*—Kenyon & Kenyon

[57] ABSTRACT

Disclosed is a structure comprising; (a) Plasma gas is supplied to torch tube 8 from inert pressure vessel 1. (b) Nebulizer 3 absorbs sample 4 to vaporize the sample as aerosol and to introduce it into plasma 5. (c) Plasma 5 touches sampling cone 10 having an opening at the apex and a conical surface, whereby an ion stream is extracted through the opening of the sampling cone whose pressure is reduced at the rear face thereof. (d) The extracted ion stream further touches skimmer cone 12 of the conical surface having a small hole at the apex, and is absorbed into vacuum chamber 13 where the pressure is further reduced at the rear face. (e) The ion stream is flowed into quadruple pole filter 18 to carry out the mass spectrometry analysis of the ion stream.

12 Claims, 4 Drawing Sheets

MASS SPECTROMETER, SKIMMER CONE ASSEMBLY, SKIMMER CONE AND ITS MANUFACTURING METHOD

BACKGROUND OF THE INVENTION

1. Field of the Invention

The present invention relates to a mass spectrometer, a skimmer cone assembly, a skimmer cone and its manufacturing method.

The present invention relates to a mass spectrometer suitable for quantitative analysis of slight amounts of cadmium, lead, manganese, etc. that are contained in the environment water such as river water, lake water and waterworks.

The present invention also relates to a mass spectrometer suitable for quantitative analysis of extremely small amounts of metal elements such as iron, chrome, nickel in a highly pure reagent that is used in the manufacturing process line of memory IC's such as microcomputers.

In addition, the present invention relates to a mass spectrometer suitable for quantitative analysis of extremely small amounts of heavy metal elements such as selenium, arsenic contained in the serum of the human being.

The present invention further relates to a skimmer cone assembly and a skimmer cone suitable for the mass spectrometer of the present invention, and to a method of manufacturing the skimmer cone.

2. Description of the Prior Art

In a plasma mass spectrometer, a sample introduced in the plasma is ionized, and the generated ions are extracted from an opening (generally called an orifice) of a sampling cone. The extracted ions are converged by an ion lens through an opening (generally called an orifice) of a skimmer cone. Then, these converged ions are analyzed by the mass spectrometer.

While the plasma is generated in the atmospheric pressure, the mass analysis of the generated ions need to be conducted in a high vacuum such as $10^{-4}$ Pa ($10^{-6}$ Torr) or more. For this reason, it is necessary to air tightly partition the sections from each other air sections so that the high vacuum section does not substantially receive the influence of the atmospheric pressure of the plasma generating section. To satisfy this condition, the pressure of the space between the sampling cone and the skimmer cone at the both ends is evacuated by differential pressure to keep its pressure, for example, 660 Pa (5 Torr) that is lower than that of the plasma generating section, and the pressure of the space at the lower stream side of the skimmer cone is evacuated to a pressure, for example, $10^{-4}$ Pa ($10^{-6}$ Torr) that is lower than the pressure of the skimmer cone.

The plasma is a high-speed plasma gas stream that is generated by giving energy of a high frequency wave or a microwave to inert gas such as argon, nitrogen etc., and its temperature is 5000° K. or more. In order to prevent re-combination of the ions and generation of the molecular ions and to effectively extract the ions in the above high-temperature and high-speed plasma gas stream, the sampling cone is arranged so as to touch the plasma. The sampling cone and the skimmer cone have divergent forms in order to reduce the turbulence of the high-temperature, high-speed plasma gas stream and the ion stream. When the opening of the sampling cone is too small, clogging easily takes place. On the other hand, when it is too big, differential exhaustion effect occurs, which results in reductions of the degree of vacuum. Therefore, the size of the opening is properly determined by taking into consideration these factors. When the opening of the skimmer cone is too big, the degree of vacuum declines, which leads to the lower sensitivity. Accordingly, the size of the opening is determined by taking into consideration the above points.

The ions, which are extracted from plasma through the opening of the sampling cone, enters the skimmer cone in the form of a supersonic jet stream. At this time, a shock wave called Mach disc is formed due to the collision with residual gas of the ions around the skimmer cone. The position where the Mach disc is produced, is related to the exhaustion speed. When the Mach disc is generated to upstream of the skimmer cone, a re-combination of the ions easily occurs, and then the space between the sampling cone and the skimmer cone is determined considering this point.

The skimmer cone is generally formed by machining into a conical form, then the opening of the specified size is formed at its top portion. There is a report on the form of the skimmer cone and the size of the opening of the skimmer cone. For example, the form is disclosed in international application number WO 90/09031 and the relationship between the opening diameter and the output signal of the ions is described in Spectrochimica acta, 45B and 1289–1299(1990), respectively, and in Analytical chemistry, 57, 2674–2679(1985), the relationship between the opening diameter and the output signal of the ions is theoretically dealt with.

As mentioned above, various researches on the size of the orifice of the skimmer cone, i.e. the size of the opening, have been made. But, no research on what value of the depth of the opening has been made yet. Therefore, few research reports on the depth of the opening are found. As is described later, according to the research by the inventors, it was proved that the opening depth of the skimmer cone gave an important influence on the performance of the mass spectrometer. That is, it was revealed that the sensitivity of the mass spectrometer was highly dependent on the opening depth of the skimmer cone; the smaller the depth dimension is, the higher the sensitivity becomes. This means that the dimension of the opening depth should be as small as possible and an allowable error in the depth dimension should be as small as possible, too. As is mentioned above, the skimmer cone is prepared by machining, and it is difficult to process the opening with a small diameter and high precision depth. As a result, the sensitivity of the mass spectrometer is lowered.

SUMMARY OF THE INVENTION

The present invention provides a mass spectrometer with a high sensitivity, a skimmer cone assembly, a skimmer cone with a shallow opening and high precision and its manufacturing method.

The present invention provides a mass spectrometer, a skimmer cone assembly, a skimmer cone and its manufacturing method at a lower cost.

Features of the present invention for solving the problems are as follows.

(1) A mass spectrometer comprising means for generating plasma; means for introducing a sample into the plasma to form ions of the sample; a sampling cone having an opening through which the generated ions pass; a skimmer cone having been formed by a pressure molding of a plate into a conical form, the skimmer cone having an opening through which the ions that have passed the opening of the sampling cone pass at the top of the conical form;

means for maintaining a pressure in a space between the sampling cone and the skimmer-cone lower than the pressure of the section wherein the plasma is formed and for maintaining a pressure in the space after the skimmer cone lower than the pressure in the space between the sampling cone and the skimmer cone; and means for analyzing the ions that have passed the opening of the skimmer cone by mass-spectrometry and for detecting analyzed ions.

(2) In the mass spectrometer according to the above means (1), the skimmer cone has a coating formed on the skimmer cone substrate.

(3) In the mass spectrometer according to the above means (2), the coating is made of gold or platinum.

(4) The mass spectrometer according to the above means (1), which further comprises a base, a clamp and means for detachably fixing the clamp to the base and for pinching the root of the skimmer cone between the base and the clamp.

(5) In the mass spectrometer according to the above means (1), wherein the plasma generating means is of the type of high frequency energy or of microwave energy.

(6) A skimmer cone, which is made by molding a plate into a conical form and an opening is formed at the top portion of the conical form through which ions pass.

(7) In the skimmer cone according to the above (6), the skimmer cone has a coating formed on the skimmer cone substrate.

(8) In the skimmer cone according to the above (7), the coating is made of gold or platinum.

(9) A skimmer cone assembly comprises a skimmer cone made by molding a plate into a conical form, having an opening formed at the top portion of the conical form, through which ions pass, a base, a clamp and means for detachably fixing the clamp to the base and for pinching the root of the skimmer cone between the base and the clamp.

(10) In the skimmer cone assembly according to the above (9), the skimmer cone assembly has a coating formed on the skimmer cone substrate.

(11) In the skimmer cone assembly according to the above (10), the coating is made of gold or platinum.

(12) In a manufacturing method of a skimmer cone, a plate is formed by a pressure molding into a conical form and an opening through which ions pass is formed at the top portion of the conical body.

(13) A mass spectrometer comprising:

means for generating plasma by high frequency energy; means for introducing a sample into the plasma generating means to produce ions of the sample; a sampling cone having a divergent portion and an opening through which the ions generated by contacted with the plasma pass at the top portion; a skimmer cone having been formed by a pressure molding of a plate into a divergent conical form and having an opening through which the ions that have passed the opening of the sampling cone pass at the top of the divergent conical form, means for maintaining a pressure in a space between the sampling cone and the skimmer cone lower than the pressure of a section wherein the plasma is formed and for maintaining a pressure in the space after the skimmer cone lower than the pressure of the space between the sampling cone and the skimmer cone, and means for analyzing the ions that have passed the opening of the skimmer cone by mass-spectrometry and for detecting analyzed ions.

The skimmer cone is formed by a pressure molding of a plate into a conical form which has an opening at the top portion. As is well known, the plate itself can be made thin with a high dimensional precision. When the skimmer cone is molded by a pressure molding into the conical form and the opening is formed at the top portion, the thickness of the plate with a high dimensional precision before the molding is maintained after the molding. That is, the opening is shallow and has a high dimensional precision. As a result, the sensitivity of the mass spectrometer becomes higher. The conical form is made by a pressure molding, and the manufacturing method becomes remarkably easier than machining, and thus the production cost can be reduced.

The skimmer cone of the present invention is provided with the base and the clamp, the latter detachably pinching the root portion of the skimmer cone between the base and the clamp. Therefore, the skimmer cone can be easily exchanged. In this case, only the skimmer cone can be exchanged, and the manufacturing cost can be further reduced. In forming the skimmer cone with a coating, a substrate can be made of such inexpensive materials as copper. The coating can be made by plating corrosion resistant materials such as gold or platinum. This means that the skimmer cones can be made at a cost much lower than that of the case where the whole skimmer cone is made of inexpensive corrosion resistant materials such as gold and platinum.

DETAILED DESCRIPTION

Figure 1:
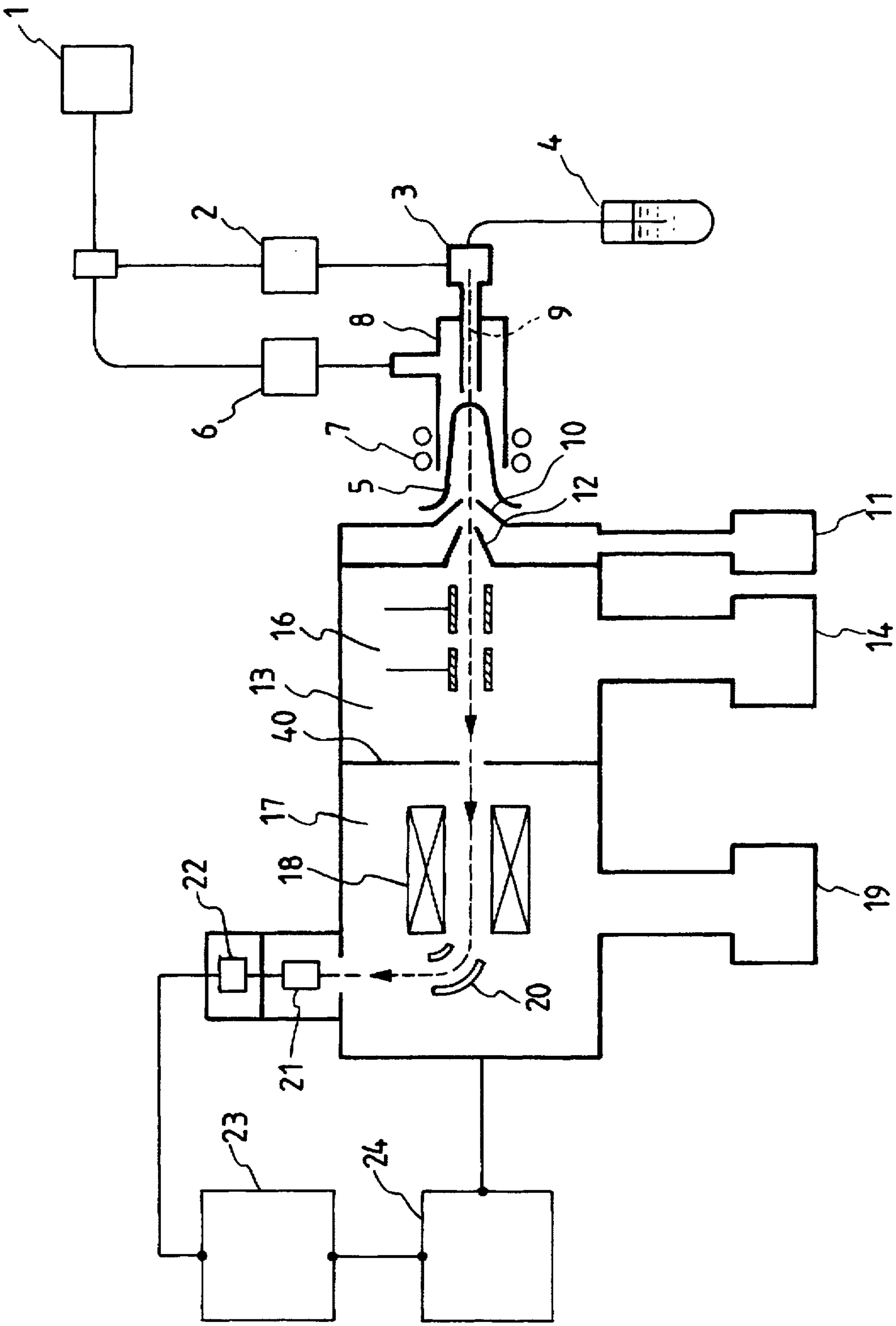
FIG. 1 is a diagram of a mass spectrometer of the present invention.

FIG. 1 shows an example of a mass spectrometer according to the present invention. Plasma of inert gas such as nitrogen gas or argon gas is supplied to nebulizer 3 and torch tube 8 from pressure vessel 1 for inert gas through gas flow regulators 2 and 6. The inert gas supplied to nebulizer 3 functions as carrier gas, and nebulizer 3 absorbs solution sample 4 through the carrier gas and makes the solution vaporize. Vaporized sample 4 becomes aerosol and is introduced into plasma 5. Plasma 5 is formed by ionization through the discharging of the plasma gas with high-frequency energy supplied to high-frequency induction coil 7. Of course, plasma 5 may be formed by the microwave energy. Plasma 5 touches metallic sampling cone 10 having an opening at the apex and a conical surface whose circumference is cooled and which is made of an electrical conductive material. The ion stream is absorbed and extracted through the opening of the sampling cone whose pressure at the rear face is reduced. As is clear from the figure, sampling cone 10 has a divergent shape. The extracted ion stream further touches skimmer cone 12 of the conical surface having a small hole at the apex thereof and is absorbed into vacuum chamber 13 where the pressure is further reduced at the rear face, followed by extraction. Skimmer cone 12 also has a divergent shape as is illustrated. There are electrostatic lenses 16 in vacuum chamber 13, and the ion stream is converged to an opening of partition wall 40 and enters vacuum chamber 17.

Next, the ion stream enters quadruple pole filter 18, and then the ion stream is analyzed by mass-spectrometry. Only the intended ions of mass number (m/z) are selected. The ions having the selected mass number are injected into ion detection device 21 through deflector lens 20 to detect. The quantity of the detected ions is counted by pulse amplifier 22 and is displayed on output display 23. Control unit 24 automatically controls the whole mass spectrometer as a system.

Plasma 5 is generated in the atmospheric pressure. On the other hand, vacuum chamber 17 for mass-spectrometry is exhausted by vacuum pump 19 to $10^{-4}$ Pa ($10^{-6}$ Torr) or less in order to maintain high vacuum. In order to prevent influence of the atmospheric pressure on vacuum chamber 17 of high vacuum, the pressure of a space between sampling cone 19 and skimmer cone 12 is exhausted to about 660 Pa (about 5 Torr) by vacuum pump 11, and vacuum chamber 13 is exhausted to about $10^{-4}$ Pa ($10^{-6}$ Torr) by vacuum pump 14, respectively.

Figure 2:
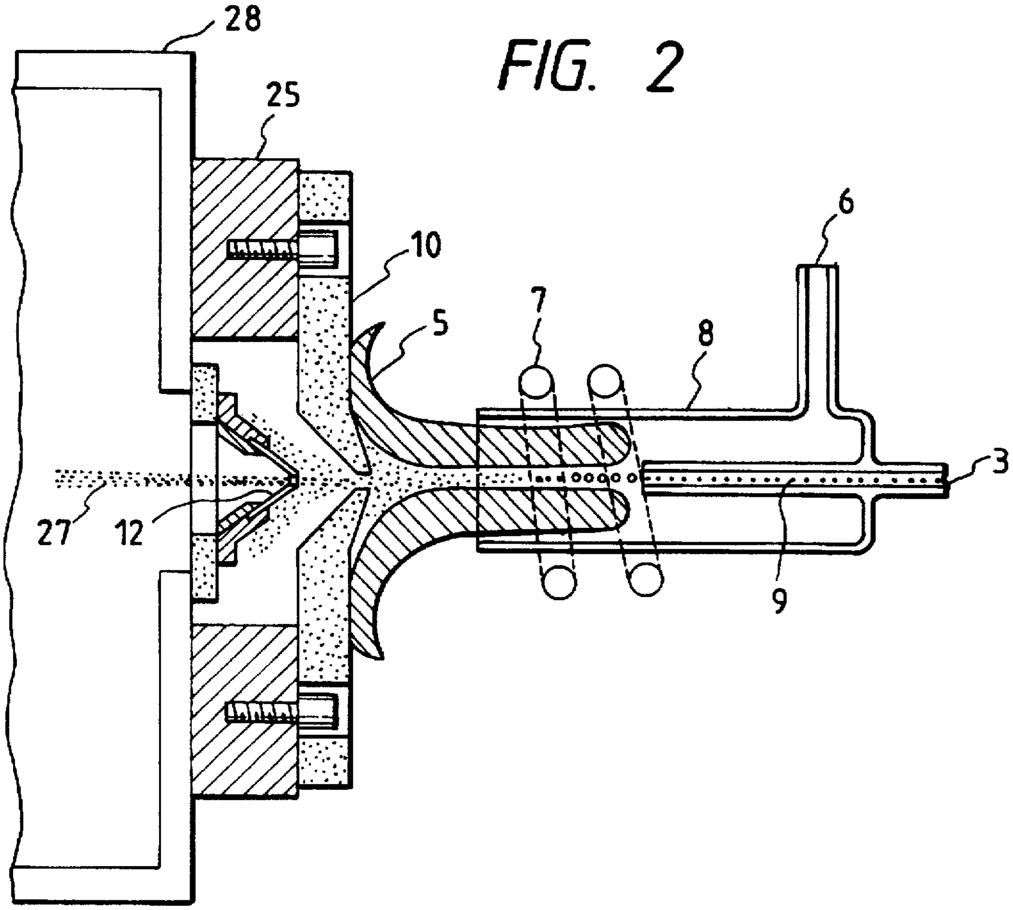
FIG. 2 is an enlarged sectional view of the interface portion of the mass spectrometer shown in FIG. 1.

FIG. 2 is an enlarged sectional view of interface portion of FIG. 1. In the figure, 25 denotes a water-cooling block that cools sampling cone 10, 27 an ion stream and 28 a wall of vacuum chamber 13, respectively.

Figure 3:
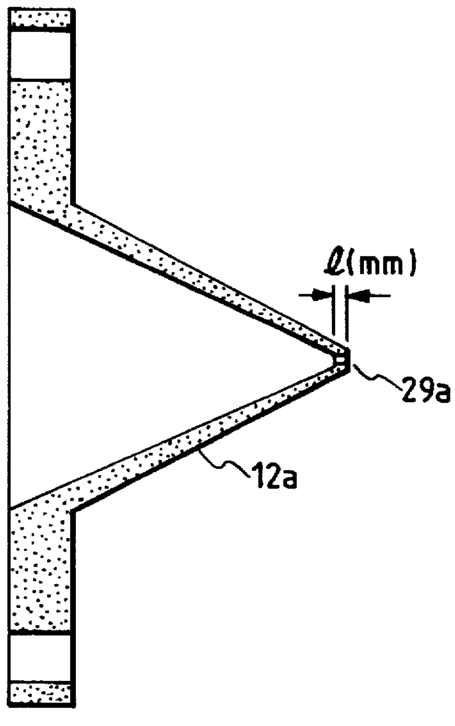
FIG. 3 is a cross-sectional view of a conventional skimmer cone.

FIG. 3 shows a cross-sectional view of ordinary sampling cone 12*a*. Sampling cone 12*a* has a conical form and is manufactured by machining a block of metallic materials such as copper, aluminum and stainless steel. Opening 29*a* formed at the top portion of the conical form has a diameter of about 0.3 to 0.8 mm $\phi$. While the ion stream increases when the opening becomes larger, the vacuum of the vacuum chamber is reduced. Therefore, the diameter of the opening is decided according to the exhausting capacity of the vacuum exhaust pump. When the depth 1 (mm) of the opening is made small, the conductance of the vacuum and the extracted ion stream can be increased. However, the mechanical properties of the sampling cone will be lowered and the sampling cone may be deformed in handling.

Figure 4A:
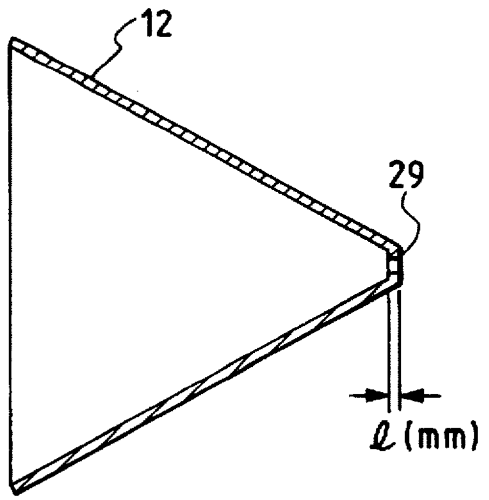
FIG. 4(*a*) and FIG. 4(*b*) show a cross-sectional view and a plan view of the skimmer cone, shown in FIG. 1, respectively.
Figure 4B:
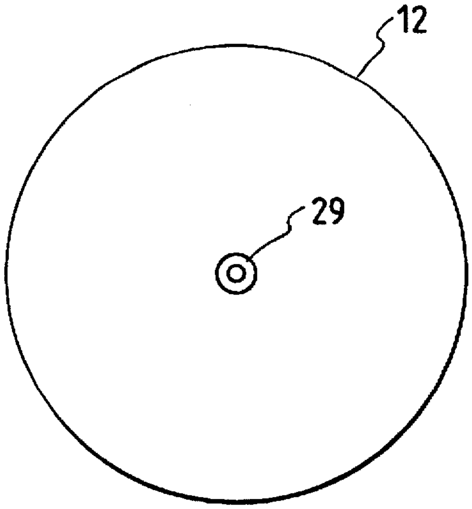

FIG. 4(*a*) and (*b*) show an enlarged cross-sectional view and a plan view of skimmer cone 12 of FIG. 1 having a conical form of the present invention. Skimmer cone 12 is made of 1 mm thick metallic plate by a pressure molding, having opening 29 at the top portion. Concretely, both a male die and a female die having a cone shape were prepared in order to make skimmer cone 12, a metallic plate being electric conductive was inserted between the both dies. The conical form was made by means of conical form dies, and then skimmer cone 12 was made by forming opening 29 at the top portion by laser beam, for example. In this case, the depth dimension 1 (mm) of opening 29 was decided by the original thickness of the plate because the original thickness of the plate is maintained as the depth of opening 29. It is well known that a plate having an accurate thickness can be easily obtained. Therefore, the depth of opening 29 of skimmer cone 12 is very accurate. Because skimmer cone 12 is shaped into the cone by a pressure molding and opening 29 is formed at the top portion, the manufacturing is much easier than machining, which leads to lowering of the production cost.

While opening 29 may be formed in the plate at first and then the plate may be formed into the shape of cone by a pressure molding so as to position opening 29 at the top portion. In this case there is a problem that opening 29 may be deformed by a pressure molding, and thus it is recommended to form opening 29 after forming of the conical form.

Figure 5:
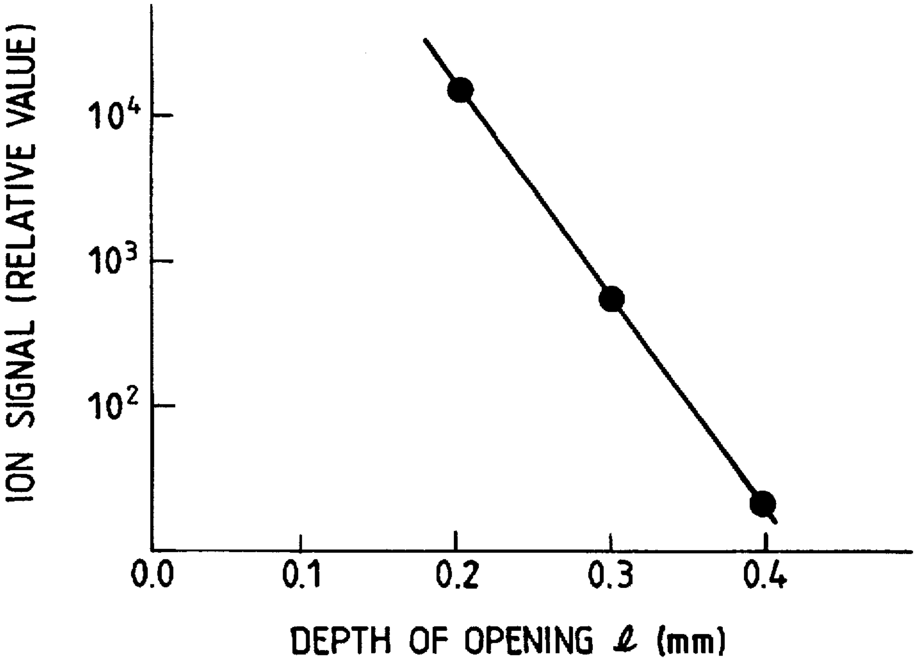
FIG. 5 is a graph showing experimental data on characteristics of ion signal intensity with respect to opening depths of the skimmer cone.

FIG. 5 shows experimental data on characteristics of ion signal intensity (i.e. sensitivity characteristic) of the mass spectrometer with respect to the depth 1 (mm) of opening 29 of skimmer cone 12 of this invention. This is a measured value obtained with regard to $^{59}Co^{+}$ ions in the case where the Co concentration in the sample is 1 (one) ppb. From the figure, it is apparent that the sensitivity of the mass spectrometer is greatly influenced by the opening depth of skimmer cone 12. The shallower the opening depth, the higher the sensitivity becomes. This means that the dimension of the opening depth should be as small as possible and an allowable error in the depth dimension should be as small as possible. The minimum depth of the opening is limited from the viewpoint of deforming etc. at the time of using, and is not unlimited. From the practical point of view, the opening depth 1 (mm) of skimmer cone 12 was 0.2±0.02 mm in this example. The skimmer cone should preferably be electric conductive in order to prevent charge-up. From this point, skimmer cone 12 may be made of metals such as copper, aluminum and stainless steel. Skimmer cone 12 can be made of materials such as gold or platinum to secure high the electric conductivity and good corrosion resistance. Because gold and platinum are expensive, skimmer cone 12 is composed of a substrate and a coating formed on the surface of the substrate, the substrate being made of materials such as copper and aluminum, the coating being made of excellent electric conductor and corrosion resistance materials such as gold and platinum. The coating can be easily formed by plating, etc.

Figure 6:
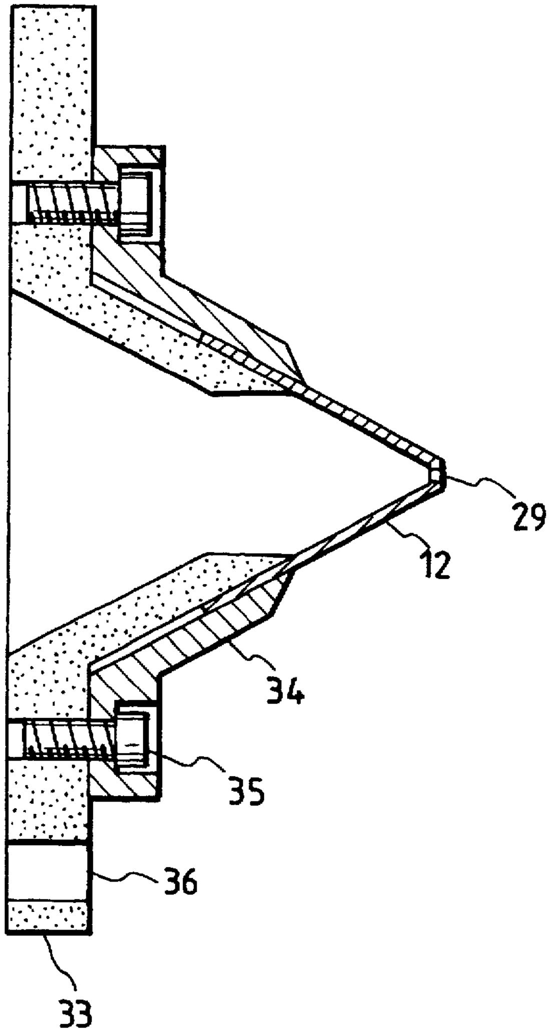
FIG. 6 is a cross-sectional view of the skimmer cone assembly using the skimmer cone shown in FIG. 1.

FIG. 6 shows a cross-sectional view of the skimmer cone assembly using skimmer cone 12 shown in FIG. 1. Provided are base 33 having a conical form and clamp 34 which is detachably connected to base 33 with screw 35 so as to pinch the root of skimmer cone 12 between base 33 and screw 34. Skimmer cone 12 is installed to wall 28 (refer to FIG. 2) of vacuum chamber 13 with a screw (not illustrated) through screw hole 36. By employing this method, the skimmer cone can be exchanged easily, if necessary. Because only the skimmer cone can be exchanged, the manufacturing cost can be further reduced.

What is claimed is:

1. A mass spectrometer comprising:

a plasma generator, circuit for introducing a sample into said plasma to form ions of said sample, a sampling cone having an opening through which the generated ions pass, a skimmer cone having been formed by a pressure molding of a plate having an initial thickness into a conical form, said skimmer cone having an opening at the top of said conical form with a thickness equal to said initial thickness, the thickness of said skimmer cone being in the vicinity of said skimmer cone opening is substantially equal to the depth of said skimmer cone opening through which said ions that have passed said opening of said sampling cone pass a first chamber for maintaining a pressure in a space between said sampling cone and said skimmer cone lower than said pressure of a section wherein said plasma is formed, a second chamber for maintaining a pressure in said space after said skimmer cone lower that said pressure in said space between said sampling come and said skimmer cone and an analyzer for analyzer said ions that passed said opening of said skimmer cone by mass-spectrometry and for detecting said analyzed ions.

2. The mass spectrometer according to claim 1, wherein said skimmer cone has a coating formed on said skimmer cone substrate.

3. The mass spectrometer according to claim 2, wherein said coating is made of gold or platinum.

4. The mass spectrometer according to claim 1, which further comprises a base, a clamp and means for detachably fixing said clamp to said base and for pinching said root of said skimmer cone between said base and said clamp.

5. The mass spectrometer according to claim 1, wherein said plasma generator is of the type of high frequency energy or of microwave energy.

6. A mass spectrometer comprising:

means for generating plasma by high frequency energy, means for introducing a sample into said plasma generating means to produce ions of said sample, a sampling cone having a divergent generated by contacting said plasma pass at the top portion thereof, a skimmer come having been formed by a pressure molding of a plate having an initial thickness into a divergent conical form and having an opening with a thickness equal to said initial thickness the thickness of said cone being in the vicinity of said skimmer cone opening is substantially equal to the depth of the skimmer cone opening through which said ions that have passed said opening of said sampling cone pass at top of said divergent conical form, means for maintaining a pressure in a space between said sampling come and said skimmer cone lower than said pressure of a section wherein said plasma is formed and for maintaining a pressure in said space after said skimmer cone lower than said pressure of said space between said sampling cone and said skimmer cone, and means for analyzing said ions that passed said opening of said skimmer cone by mass-spectrometry and for detecting said analyzed ions.

7. A mass spectrometer comprising:

a plasma generator, a circuit for introducing a sample into said plasma to form ions of said sample, a sampling cone having an opening through which the generated ions pass, a pressure molded skimmer cone having a conical form and an initial thickness, said skimmer cone having an opening at the top of said conical form with a thickness equal to said initial thickness, the thickness of said cone being in the vicinity of the skimmer cone opening is substantially equal to the depth of the skimmer cone opening through which said ions that have passed said opening of said sampling cone pass, a first chamber for maintaining a pressure in a space between said sampling cone and said skimmer cone lower than said pressure of a section wherein said plasma is formed, a second chamber for maintaining a pressure in said space after said skimmer cone lower that said pressure in said space between said sampling come and said skimmer cone, and an analyzer for analyzer said ions that passed said opening of said skimmer cone by mass-spectrometry and for detecting said analyzed ions.

8. The mass spectrometer according to claim 7, wherein said skimmer cone has a coating formed on said skimmer cone substrate.

9. The mass spectrometer according to claim 8, wherein said coating is made of gold or platinum.

10. The mass spectrometer according to claim 7 further comprising:

a base, a clamp, and means for detachably fixing said clamp to said base and for pinching said root of said skimmer cone between said base and said clamp.

11. The mass spectrometer according to claim 7, wherein said plasma generator is one of the type of high frequency energy or of microwave energy.

12. The mass spectrometer according to claims 7, wherein the thickness from the opening of said skimmer cone and a bended portion of said skimmer cone are substantially equal.

* * * * *